Nov. 20, 1962  J. A. VERHEYDEN  3,064,672
TAKING OFF LIQUIDS
Filed Aug. 14, 1959  2 Sheets-Sheet 1
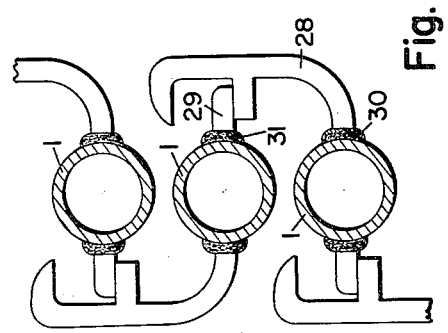
Fig. 4
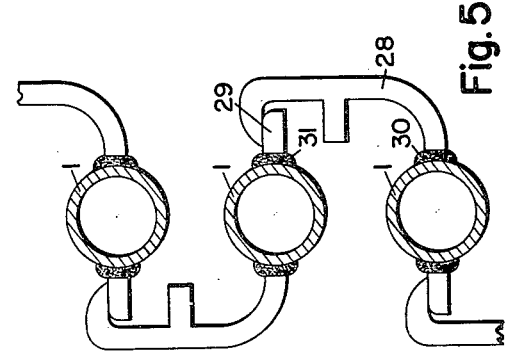
Fig. 5
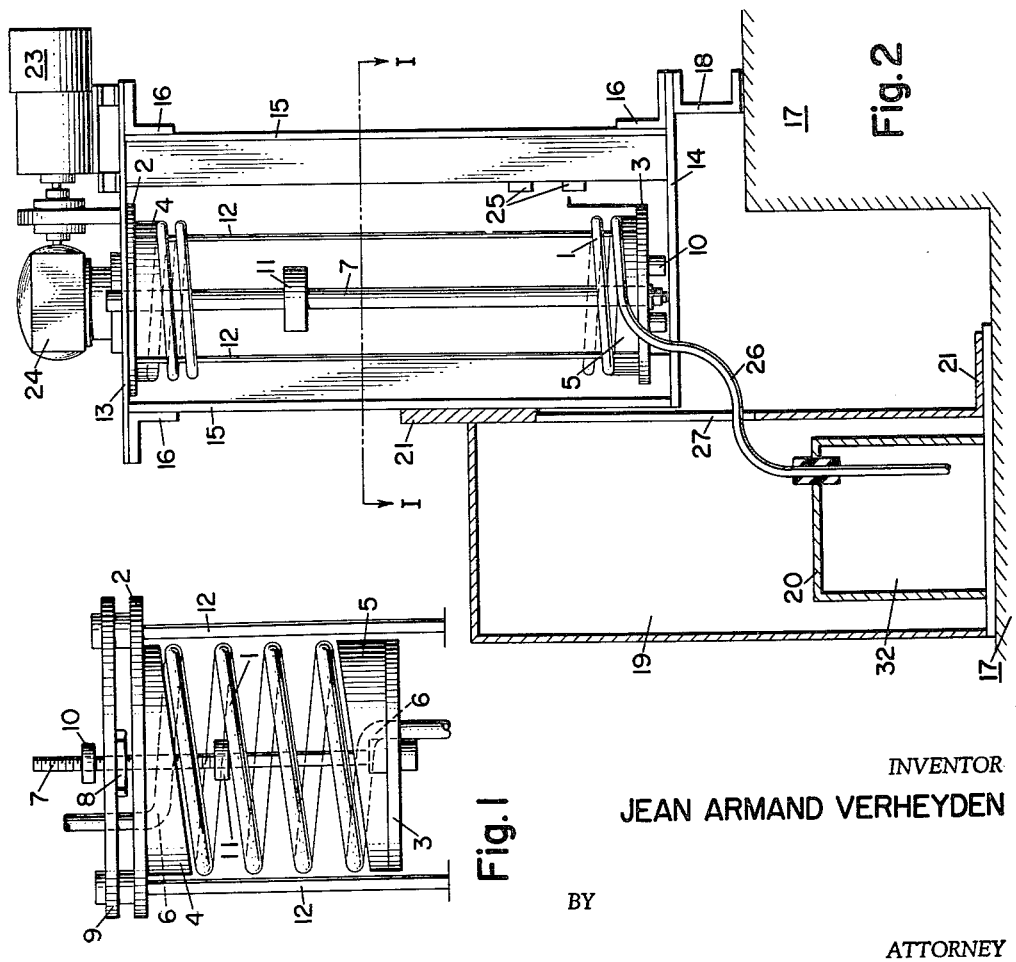
Fig. 2
Fig. 1
INVENTOR
JEAN ARMAND VERHEYDEN
BY
ATTORNEY Nov. 20, 1962 J. A. VERHEYDEN 3,064,672
TAKING OFF LIQUIDS
Filed Aug. 14, 1959 2 Sheets-Sheet 2

INVENTOR
JEAN ARMAND VERHEYDEN

BY

ATTORNEY

United States Patent Office

3,064,672
Patented Nov. 20, 1962

1

3,064,672
TAKING OFF LIQUIDS
Jean Armand Verheyden, Courbevoie, France, assignor to Commissariat a l'Energie Atomique, Paris, France
Filed Aug. 14, 1959, Ser. No. 833,788
Claims priority, application France Aug. 29, 1958
6 Claims. (Cl. 137—147)

Taking off liquids of different density separated by a reciprocating movement in receptacles, such as swinging gyroscopic centrifuges, involves difficulties either because of their lateral displacement upon starting, or, when the same system is to be used for the different liquids separated in this manner, because of differences in the levels of the said liquids.

The end of the tube via which take-off is effected must remain constantly inside the liquid to be taken off, and must consequently follow the level whereof the relative height varies.

According to the present invention there is provided a conduit of variable length comprising a pipe formed as a resilient helix disposed between two abutments, means being provided for adjusting the distance between the abutments and hence the lineal distance between the ends of the helix.

The pipe may be:

(1) Permanently compressed by the abutments, whether they are brought nearer to one another or moved apart; this is the variant which has been adopted in the embodiment which will be described later.

(2) Either in compression or in tension, its natural state of balance being reached with the abutments in an intermediate position.

(3) Permanently stretched by the abutments, except when the latter are brought as close together as possible.

The first variant is easier to embody, since the pipe need not be attached to the seats of the abutments.

The second variant offers the advantage, for a given degree of fatigue in the metal, either of increasing the amplitude of movement or of reducing the number of turns, and therefore the bulk of the appliance and losses of charge.

This device enables the various layers of liquids contained in a fixed decanter, for example, to be taken off without any need permanently to leave in the liquid tubes of differing length, which are unusable when the nature of the mixture, and therefore the relative height of each decanted layer, is changed.

Another advantage of the said device is that it lends itself to remote control, the effect being that the end of the pipe automatically comes into place inside the layer of selected density, while following any variations in relative height of the liquid level; this may be accomplished by a motor which will control the spacing of the abutments.

In order that the present invention may be understood there will now be described an embodiment given by way of example only, reference being had to the accompanying drawing in which:

FIGURE 1 illustrates a diagrammatic elevation of the device to which the invention relates.

FIGURE 2 illustrates an elevation of an embodiment of the device to which the invention relates.

FIGURE 4 illustrates a sectional view of the turns of the helical tube in the compressed state, with their safety key.

FIGURE 5 illustrates the same sectional view as FIGURE 4, the turns being in a state of tension.

2

Figure 6:
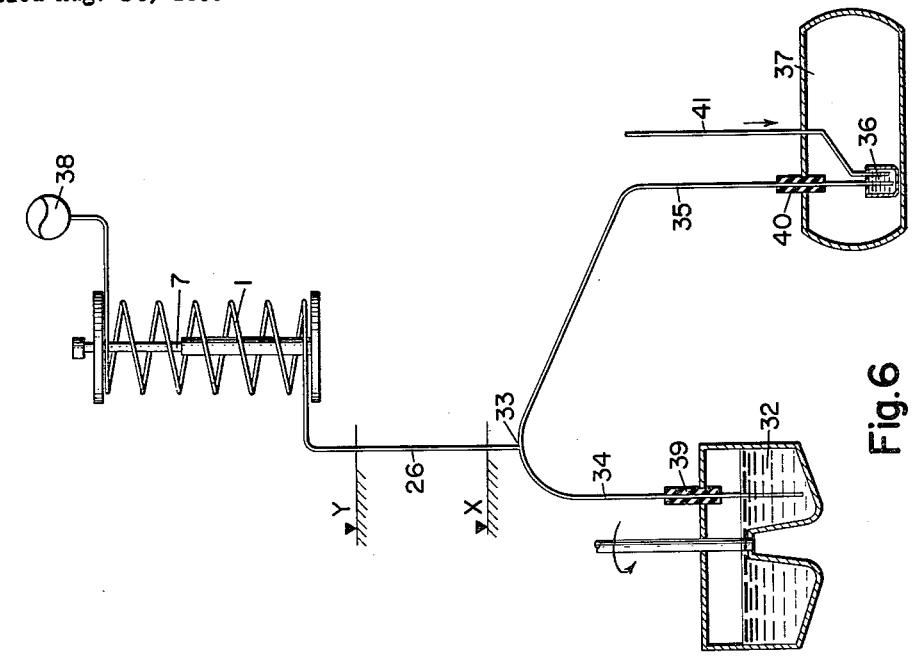

FIGURE 6 illustrates a diagrammatic elevation showing how the device according to the invention is used.

Only the elements required for an understanding of the invention are illustrated in these FIGURES, corresponding elements in the different FIGURES bearing-identical reference numbers.

The tube or pipe 1 (FIGURE 1), wound into a helix, comprises a certain number of turns; it is compressed between the plates or abutments 2 and 3 by way of seats 4 and 5 which are intended to prevent the tube from being broken at its ends 6. The spacing between the plates 2 and 3 may be altered by means of the threaded shaft 7, which screws into the nut 8 and is translationally fast with the plate 3; the said nut is held captive between the plate 2 and a plate 9 fast with the plate 2. If the nut 8 is rotated by any suitable means, the threaded shaft moves, its stroke driving the plate 3. The abutments 10 and 11 limit the stroke of the shaft 7. The guides 12 prevent the plate 3 from rotating with respect to the plate 2, and keep the two plates parallel.

Figure 3:
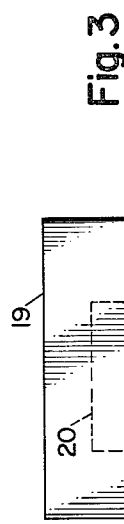
FIGURE 3 illustrates a sectional view along I—I in FIGURE 2, this view having subsequently been rotated through a quarter of a turn.
Figure 3:
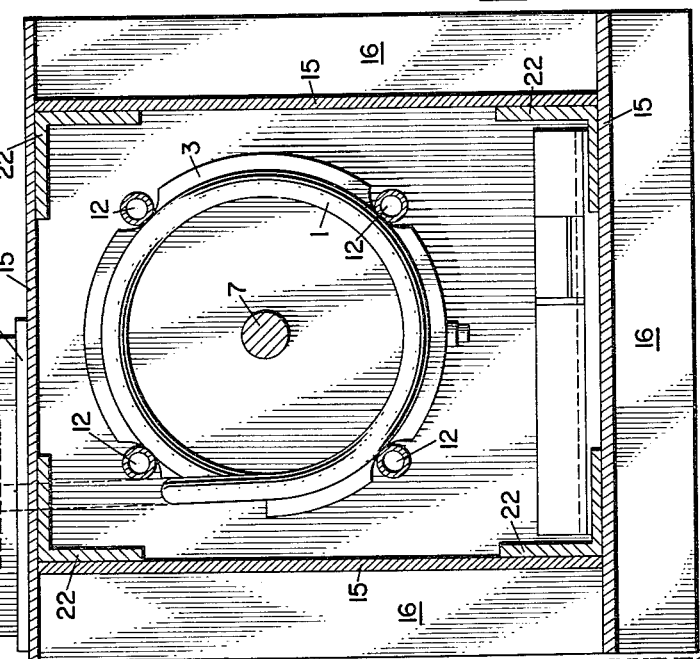

The device to which the invention relates is disposed in a frame (FIGURES 2 and 3) consisting of a horizontal upper plate 13 and a horizontal lower plate 14, connected by vertical side-plates 15; these vertical side-plates are attached to the plates 13 and 14 by angle-irons 16.

In order to facilitate understanding of FIGURE 2, the front plate 15 is not shown.

The frame is attached to a base 17 by an iron 18, and to an enclosure 19, containing the appliance 20 in which take-off is effected, by a plate 21 which also serves to attach the enclosure 19 to the base 17.

The vertical angle-irons 22 (FIGURE 3) serve to hold the plates 15 in place.

An electric motor 23 longitudinally displaces the shaft 7 by way of the reduction gear 24 and a system comprising a nut and an endless screw, not illustrated in FIGURE 2, but similar to that shown in FIGURE 1; the threaded upper end of the said shaft 7 constitutes the endless screw portion. Two electrical safety contacts 25 limit the rise or fall of the helical tube 1, and prevent forces from being exerted on the abutments 10 and 11.

The helical tube is connected to the receptacle 19 in which take-off is effected by a rigid tube 26 of suitable shape which is allowed free play in a slot 27 in the plate 21.

The tube 1 runs the risk of being distorted as it undergoes compression and tension; lugs 28 and abutments 29 (FIGURES 4 and 5) are welded at 30 and 31 respectively to the turns of the tube 1 in order to distribute the forces. When the tube 1 is compressed (FIGURE 4), the lugs 28 are in contact with the lower face of the abutments 29; when the tube 1 is stretched in order to effect a take-off (FIGURE 5), the lugs 28 are in contact with the upper face of the abutments 29, distributing the forces over the various turns so that they cannot become permanently distorted.

In a non-limitative embodiment of the device according to the invention, the tube had an external diameter of 24 mm., and an internal diameter of 20 mm.; the helix which it formed had 25 turns 150 mm. in diameter. The height of the tube when stretched was 1,200 mm., and its stroke was 240 mm.

In this embodiment (FIGURE 6), the tube 26 is not directly immersed in the decanter 32, but is connected to the top 33 of a siphon whereof one of the branches 34 is immersed in the said decanter, and the other in a receptacle 36 inside a fluid-tight reservoir 37 situated at a lower level.

The fixed end of the coil 1 is connected to a vacuum pump 38.

Liquid is transferred from the decanter 32 to the receptacle 36 in the following manner:

The siphon is lowered to the desired level by displacement of the shaft 7; because the branches 34 and 35 are asymmetrical they are guided by fluid-tight rings 39 and 40 passing respectively through the cover of the decanter 32 and the wall of the reservoir 37.

The coil and the siphon are together connected to a source of vacuum; the liquid in the decanter to be taken off rises into the branch 34, and the liquid for priming the siphon, which has previously been conveyed by the tube 41 to the receptacle 36, rises into the branch 35.

The vacuum is cut off when the two liquids, having risen above the top of the siphon 33, together reach a level between X and Y in the tube 26. The siphon is then primed, and transfer from the decanter 32 to the receptacle 36 takes place.

What is claimed is:

1. In apparatus for drawing liquid from various levels in a vessel, a pair of spaced plates, means for moving said plates toward and away from each other, a tube formed into a helix between said plates, said means including a screw engaging said plates and motor means for rotating said screw, means connected to an end of said tube for drawing a vacuum in said tube, a syphon connected to the other end of said tube and a reservoir, one end of said syphon entering said vessel and the other end of said syphon discharging into said reservoir.

2. Apparatus as described in claim 1 including reduction gearing between said motor means and said screw.

3. Apparatus as described in claim 1, including an abutment on each turn of the helix and a pair of spaced lugs on the adjacent run of the helix receiving the associated abutment therebetween whereby permanent distortion of the tube by excessive extension and compression is prevented.

4. Apparatus as described in claim 1 in which the helix is under permanent compression.

5. Apparatus as described in claim 1 in which the equilibrium position of the helix between compression and tension is at an intermediate position of said plates.

6. Apparatus as described in claim 1 in which the helix is permanently under tension with its equilibrium position at minimum spacing of said plates.

References Cited in the file of this patent
UNITED STATES PATENTS

| | | |
|---|---|---|
| 1,242,560 | Kingsbury | Oct. 9, 1917 |
| 1,944,243 | Kegl et al. | Jan. 23, 1934 |
| 2,549,968 | Hachmuth | Apr. 24, 1951 |